US012036686B2

(12) United States Patent
Thompson

(10) Patent No.: US 12,036,686 B2
(45) Date of Patent: Jul. 16, 2024

(54) SHEATH WITH MODULAR LOCKING ATTACHMENTS

(71) Applicant: Greg Thompson, Vass, NC (US)

(72) Inventor: Greg Thompson, Vass, NC (US)

( * ) Notice: Subject to any disclaimer, the term of this patent is extended or adjusted under 35 U.S.C. 154(b) by 105 days.

(21) Appl. No.: 17/963,674

(22) Filed: Oct. 11, 2022

(65) Prior Publication Data

US 2023/0110564 A1 Apr. 13, 2023

Related U.S. Application Data

(60) Provisional application No. 63/254,896, filed on Oct. 12, 2021.

(51) Int. Cl.
*B26B 29/02* (2006.01)
*A45F 5/02* (2006.01)

(52) U.S. Cl.
CPC .............. *B26B 29/025* (2013.01); *A45F 5/02* (2013.01); *A45F 5/021* (2013.01); *A45F 2200/0591* (2013.01)

(58) Field of Classification Search
CPC .... A45F 5/021; A45F 5/14; A45F 2200/0591; B26B 29/02; B26B 29/025
USPC ................... 224/232, 666, 669, 677; D3/220
See application file for complete search history.

(56) References Cited

U.S. PATENT DOCUMENTS

| | | | | |
|---|---|---|---|---|
| 3,533,540 | A * | 10/1970 | Carinci | A41F 9/002 224/232 |
| 5,255,436 | A * | 10/1993 | Yoshida | B26B 29/025 224/232 |
| D369,673 | S * | 5/1996 | Morton | D3/220 |
| D378,243 | S * | 3/1997 | Seber | D3/220 |
| 5,647,130 | A * | 7/1997 | Collins | B26B 29/025 30/162 |
| 6,138,363 | A * | 10/2000 | Kawashima | B26B 29/025 30/162 |
| 6,427,333 | B1 * | 8/2002 | Veltz | B26B 29/025 30/162 |
| 6,981,290 | B2 * | 1/2006 | Terzuola | B26B 17/00 224/232 |
| D714,047 | S * | 9/2014 | Ko | D3/220 |
| 10,363,675 | B2 * | 7/2019 | Robinson | B26B 3/00 |
| 2013/0026054 | A1 * | 1/2013 | Adams | B26B 29/025 206/349 |
| 2014/0338197 | A1 * | 11/2014 | Frazer | B26B 29/025 30/151 |
| 2023/0110564 | A1 * | 4/2023 | Thompson | B26B 29/025 224/232 |

* cited by examiner

*Primary Examiner* — Justin M Larson
(74) *Attorney, Agent, or Firm* — COATS & BENNETT, PLLC

(57) ABSTRACT

A sheath with modular locking attachments is designed so that it can be secured to the body to prevent the knife and/or sheath from hanging on equipment. The locking attachments secure the sheath to the body and lock the knife in the sheath to prevent an enemy combatant from removing the knife and using it against the knife owner, while allowing the knife owner to easily unlock and deploy the knife when needed.

16 Claims, 4 Drawing Sheets

SHEATH WITH MODULAR LOCKING ATTACHMENTS

RELATED APPLICATIONS

The present application claims benefit of U.S. Provisional Application 63/254,896, filed on Oct. 12, 2021, the disclosure of which is incorporated herein by reference in its entirety.

TECHNICAL FIELD

The present disclosure relates generally to knife sheaths and. more particularly to modular locking attachments for knife sheaths.

BACKGROUND

Knives used in combat situations are often too bulky and not secured properly to the body, which makes it easy for the knife handle and/or sheath to get hung on equipment and objects. In some cases, the knife sheath lacks a retention mechanism to secure the knife in the sheath, making it easy for an opponent to grab the knife and use against the knife owner. In other cases, the retention mechanism for the knife is knife is too complex, making it difficult to deploy the knife quickly in stressful situation.

SUMMARY

The present disclosure relates to a sheath with modular locking attachments. The sheath is designed so that it can be secured to the body to prevent the knife and/or sheath from hanging on equipment. The locking attachments secure the sheath to the body and lock the knife in the sheath to prevent an enemy combatant from removing the knife and using it against the knife owner, while allowing the knife owner to easily unlock and deploy the knife when needed.

In one embodiment, the sheath is provided with a locking belt clip and locking knife clip. The locking belt clip and locking knife clip are configured to be removably mounted on opposite sides of the sheath and secured using the same set of fasteners.

In another embodiment, the sheath is provided with a locking knife clip configured to be detachably mounted to the sheath for securing the knife in the sheath. The locking knife clip includes an inwardly a resilient arm with an inwardly projecting tab configured to engage the knife while the knife is in the sheath to prevent the knife from being removed from the sheath without first disengaging the locking knife clip. The resilient arm further includes a pair of wings that extend above a top end of the sheath. The wings are disposed on opposing sides of the knife handle when the knife is inserted into the sheath and are configured to be engaged by the user's finger to disengage the locking knife clip to allow removal of the knife from the sheath.

In yet another embodiment, the sheath is provided with a locking belt clip for securing the sheath to a user's belt and a retention strap. The locking belt clip includes a resilient arm designed to slide over the user's belt with a lower end extending below the user's belt and an inwardly projecting tab on the lower end of the resilient arm configured to engage the user's belt to prevent the locking belt clip from lifting off the user's belt. The retention strap includes a ring configured to engage the locking belt clip and a securing strap with mating fasteners on opposite ends thereof for extending around the knife handle. In some embodiments, the retention strap further includes a connecting strap configured to be interwoven with a MOLLE vest to hold the knife against the user's body.

DETAILED DESCRIPTION

Figure 1:
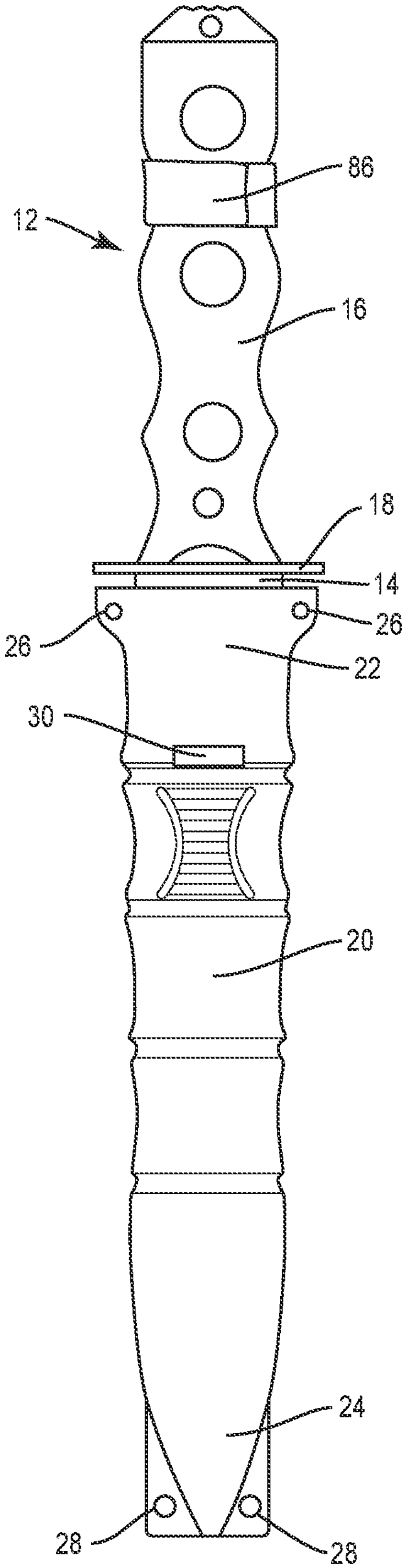
FIG. 1 is a front elevation view of a sheath according to an embodiment.
Figure 2:
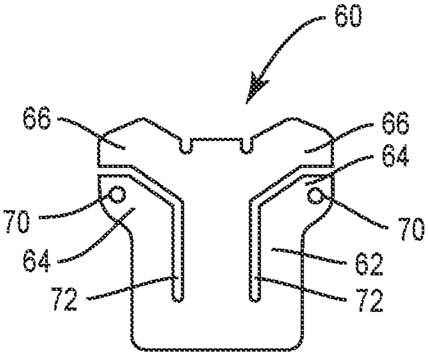
FIG. 2 is front elevation view of a locking knife clip that attaches to the sheath.

The present disclosure relates to a sheath, indicated generally by the numeral 10, with modular locking attachments. The sheath 10 is designed so that it can be secured to the body to prevent the sheath 10 from hanging on equipment. The locking attachments lock the knife in the sheath 10 to prevent an enemy combatant from removing the knife and using it against the knife owner, while allowing the knife owner to easily unlock and deploy the knife when needed.

The main components of the sheath 10 comprise the sheath case 20, a locking belt clip 40, locking knife clip 60, and retention strap 80. The sheath 10 is designed to receive and hold a knife 12, which is shown in some of the figures. The knife 12 comprises a blade 14, handle 16, and finger guard 18.

The sheath case 20 includes an opening in the upper end 22 and is designed to receive the blade 14 of the knife 12. In one embodiment, the sheath case 20 is molded from plastic, such as a polypropylene, but other materials could be used. The knife blade 14 can be inserted into the sheath case 20 until the finger guard 18 contacts the upper end 22 of the sheath case 20. A first set of through holes 26 are formed in the upper end 22 of the sheath case 22 for detachably mounting the locking belt clip 40 and locking knife clip to the sheath case 120 as hereinafter described. A second set of through holes 28 are formed in the lower end 24 of the sheath case 22. The through holes 28 can be used with a string or cord (not shown) to secure the lower end 24 of the sheath case 22 to the user's body armor or clothing. A lip 30 integrally formed with the sheath case 20 during the molding process is disposed on a central portion of the sheath case 20. The purpose of the lip 30 is to help secure the locking knife clip 60 to the sheath case 20 as will be described in more detail below.

Figure 3:
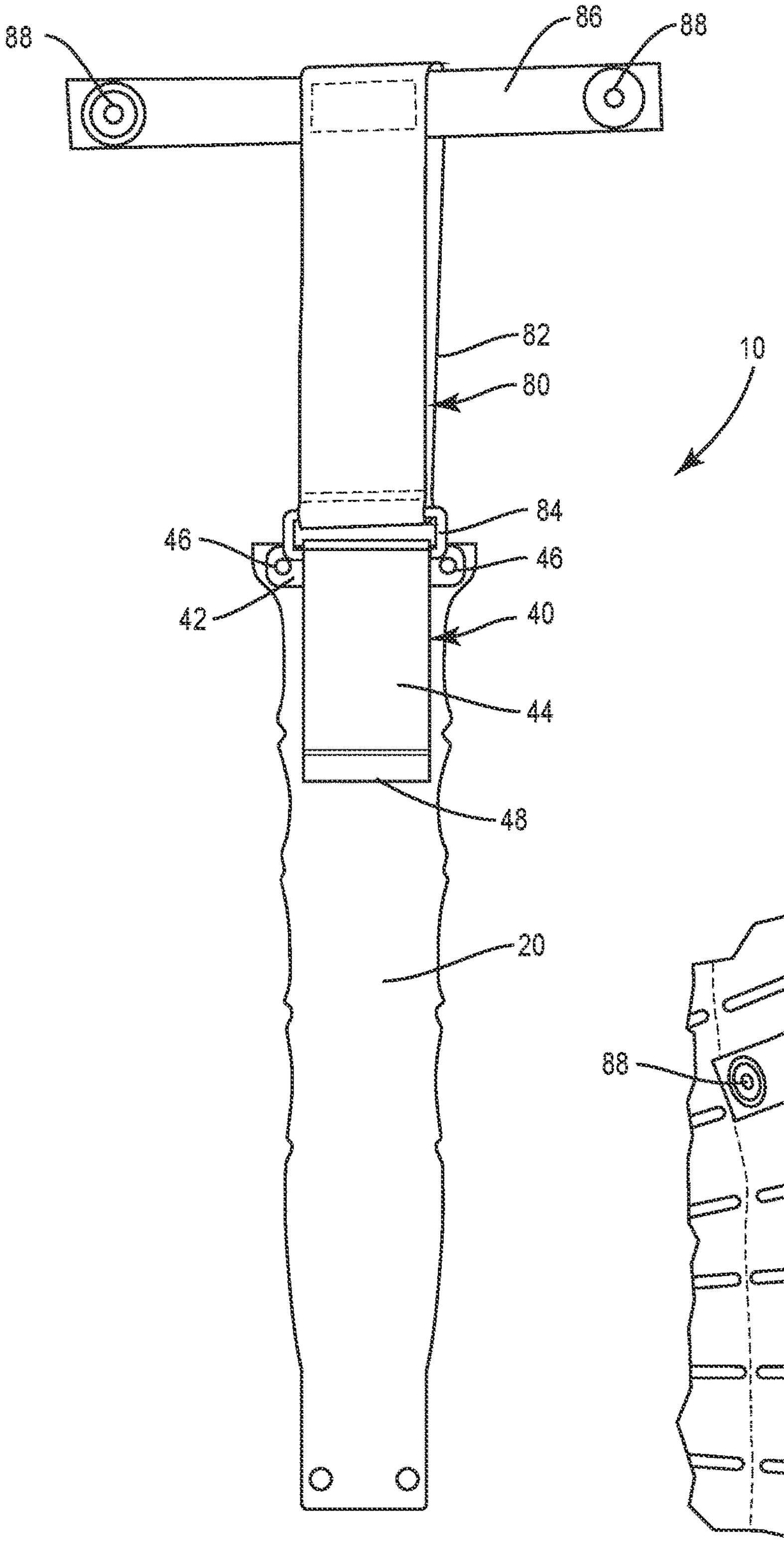
FIG. 3 is a rear elevation view of a sheath with a retention strap attached.
Figure 6:
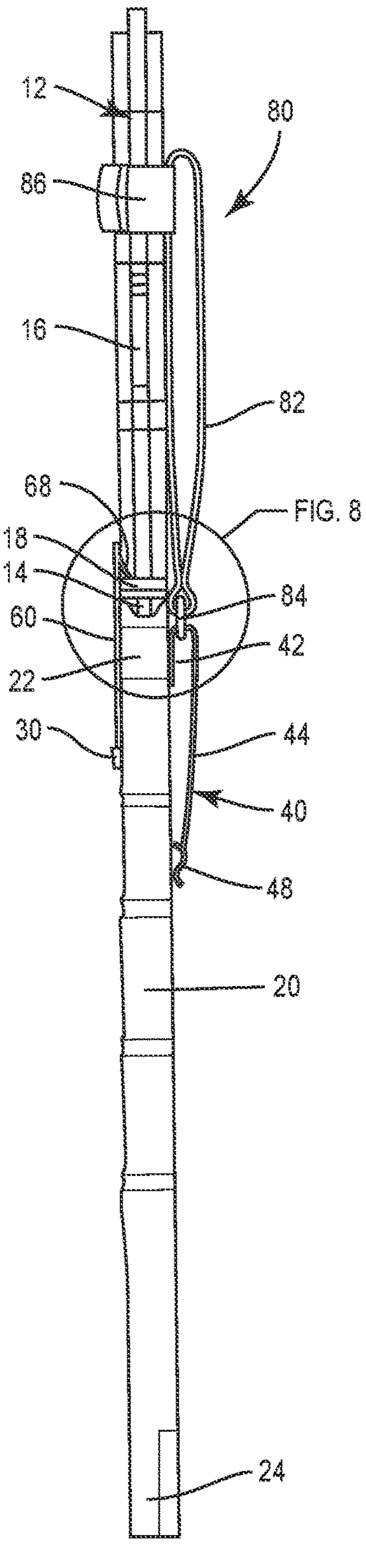
FIG. 6 is a side elevation view of the sheath with the locking knife clip and locking belt clip attached.
Figure 7:
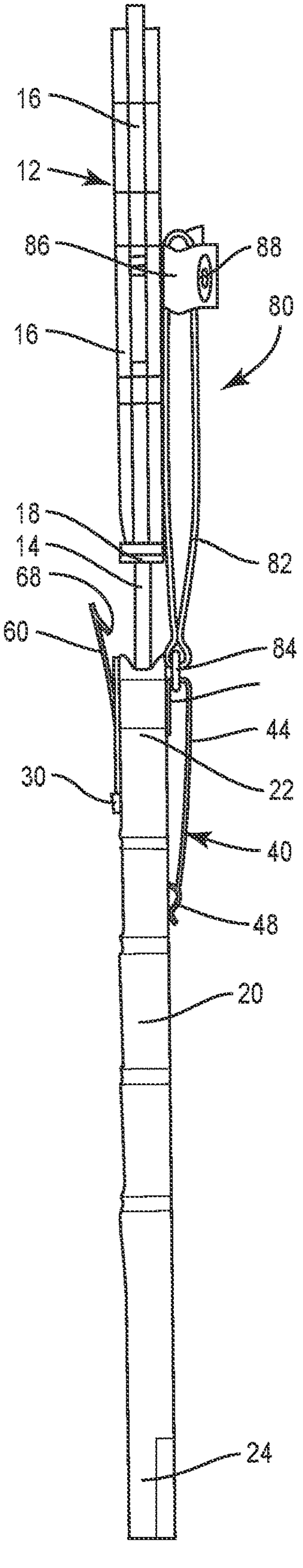
FIG. 7 is a side elevation view of the sheath with the locking knife clip and locking belt clip attached.

The locking belt clip 40, shown in FIGS. 3, 6 and 7, removably attaches to the upper end 22 of the sheath case 20 on the side of the sheath facing the user's body. The locking belt clip 40 includes a mounting plate 42 and a resilient arm 44, which may be stamped from a single piece of spring steel or other resilient material. The mounting plate 42 includes a pair of mounting holes 46 that align with the through holes 26 in the upper end 22 of the sheath case 20.

When attached to the sheath case 20, the resilient arm 42 of the locking belt clip 40 is designed to slide over the user's belt. The lower end of the resilient arm 42 includes an inwardly bent tab 48 as shown in FIGS. 6 and 7 to prevent the locking belt clip 40 from sliding up and off of the user's belt. The tab 48 is designed so that the resilient arm 44 flexes outward slightly to allow the tab 48 to pass over the user's belt when attaching the sheath 10 but will catch the user's belt when being lifted off the user's belt. To remove the sheath 10 from the user's belt, the resilient arm 44 can be lifted slightly with a finger so that the belt can slide beneath the tab 48 as the sheath is being lifted. Thus, the tab 48 prevents the sheath from being unintentionally removed from the user's belt.

Figure 8:
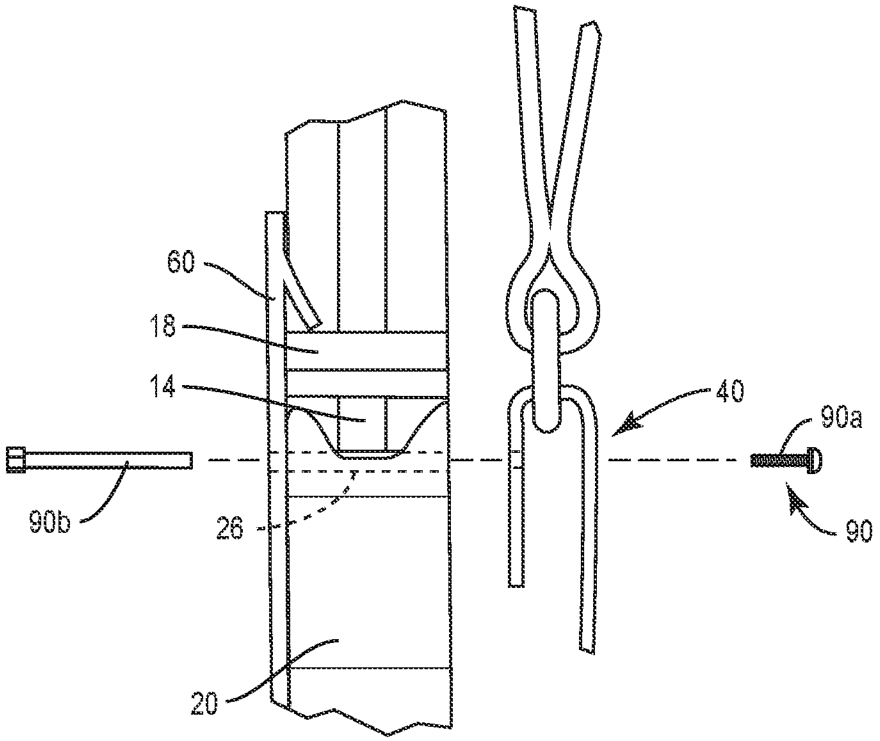
FIG. 8 is a detail view showing how the locking attachments are secured to the sheath case.

Threaded fasteners 90 secure the locking belt clip 40 to the sheath case 20 as shown in FIG. 8. The threaded fasteners 90 pass through the mounting holes 46 in the mounting plate 42 and extend into the through holes 26 in the sheath case 20. In one embodiment, the threaded fasteners 90 comprise threaded screws 90*a* that pass through the openings 44 in the mounting plate 42 and extend into the through holes 26 in the sheath case 20. The threaded screws 90*a* may be secured by barrel nuts 90*b* that extend into the through holes 26 from the opposite side of the sheath case 20 and threadedly engage with the threaded screws 90*a*. The barrel nuts 90*b* can be sized to snugly fit into the through holes. An advantage of using barrel nuts 90*b* is that the nut prevents the threads on the screw 90*a* from cutting into and wearing the inner surface of the through holes 26. Those skilled in the art will appreciate, however, that a conventional nut that threads onto a protruding end of the screw 90*a* could be used instead of a barrel nut 90*a*. In this case, a sleeve (not shown) can be inserted into the through holes to protects the inner walls of the through holes 26. In another embodiment, a threaded sleeve (not shown) can be inserted into the through hole 26 to engage with the threaded screw 90*a*. Also, it may be noted that the arrangement of the threaded screw 90*a* and nut 90*b* could be reversed with the barrel nut 90*b* passing through the mounting holes 46 in the mounting plate 42 and into the through holes 26, and the threaded screw extending into the through holes 26 from the opposite side.

The locking knife clip 60 removably attaches to the top end of the sheath case 20 on the side opposite the locking belt clip 40. The locking knife clip 60 includes a base plate 62 and a resilient arm 64, which may be stamped from a single piece of spring steel or other resilient material. The base plate 62 includes a pair of openings 66 that align with the through holes 26 in the upper end 22 of the sheath case 20. The base plate 62 includes a pair of mounting holes 66 that align with the through holes 26 in the upper end 22 of the sheath case 20. The resilient arm 64 attaches at one end to the base plate 62. Slots 72 separate the resilient arm 64 from the base plate 62 to allow the resilient arm 64 to flex outward. The resilient arm 64 includes a pair of wings 68 and an inwardly projected tab 70 that extends over the finger guard 18 of the knife 12 when the knife 12 is inserted into the sheath 10 to retain the knife 12 in the sheath 10. The wings 66 extend above the upper end 22 of the sheath case 20 and are disposed on opposing sides of the knife handle 16 when the knife 12 is inserted into the sheath 10. To remove the knife 12 from the sheath 10, the user uses a finger to push the resilient arm 64 outward by pushing the wings 66 so that the tab 68 disengages from the finger guard 18 and allows the knife 12 to be withdrawn from the sheath 10.

In a preferred embodiment, the same through holes 26 and fasteners 90 are used to attach the locking belt clip 40 and locking knife clip 60, which can be used separately or together. Thus, when used together, one set of threaded fasteners 90 is used to secure both components. As one example, threaded screws 90*a* may pass through the mounting holes 42 of the locking belt clip 40 on one side of the sheath case 22 and extend into the through holes 26 of the sheath case 20. Barrel nuts 90*b* may pass through the mounting holes 66 in the locking knife clip 60 on the opposite side of the sheath case and extend into the though holes 26 of the sheath case. Of course, this arrangement could be reversed.

Figure 4:
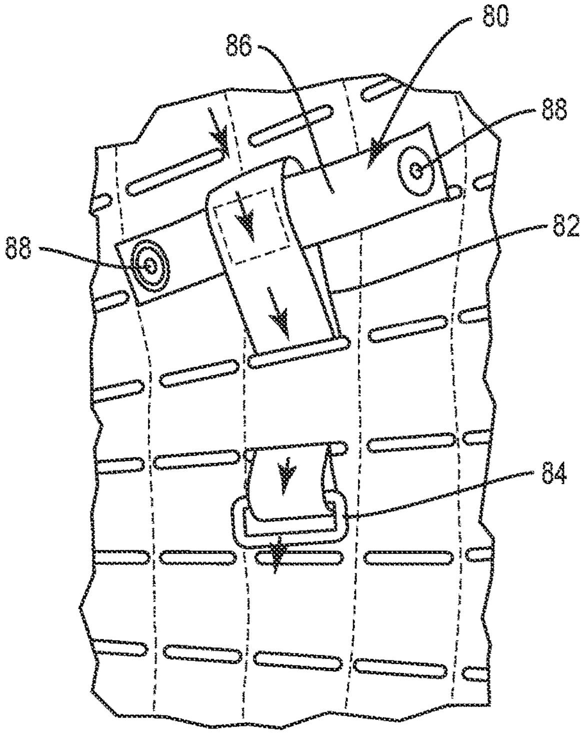
FIG. 4 is a detail view illustrating attachment of the retention strap to a MOLLE vest.
Figure 5:
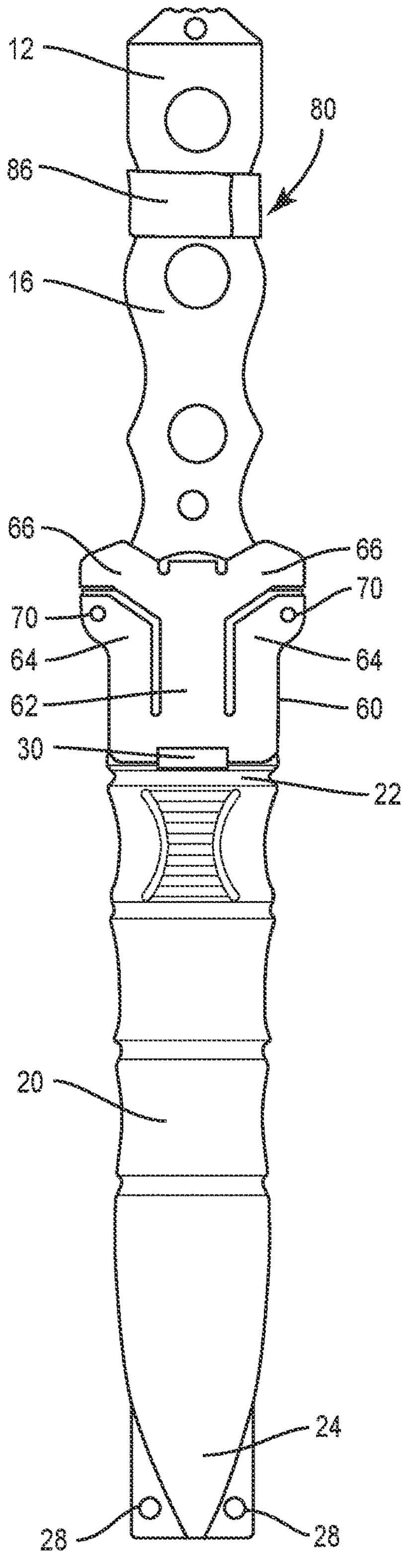
FIG. 5 is a front elevation view of a sheath with the locking knife clip attached.

In some embodiments, a retention strap 80 may be used in conjunction with the locking knife clip 60 to provide a second knife retention function. The retention strap 80 comprises a connecting strap 82 made of a nylon with a D-ring 84 attached at one end and a securing strap 86, also made of nylon, attached at the opposite end of the connecting strap 82. In one embodiment, the connecting strap 82 may be in the form of a loop. The securing strap 86 includes mating fasteners 88 on opposing ends. The mating fasteners may comprise buttons, snapes, or similar fasteners. As shown in the illustrations, the D-ring 86 can slide underneath and engage with the locking belt clip 40. When a knife 12 is inserted into the sheath 10, the ends of the securing strap 86 can be wrapped around the knife handle 16 and secured together to provide a second knife retention feature. The connecting strap 82 of the retention strap 80 is configured to be woven through slots in Molle lightweight-body armor as shown in FIG. 4, so that the knife is held against the user's body, making it less likely for the knife handle to get hung up with the knife or other equipment.

What is claimed is:

1. A sheath assembly with modular locking attachments, the sheath assembly comprising a sheath configured to hold a knife;

a locking belt clip configured to be detachably mounted to the sheath for securing the sheath to a user's belt, the locking belt clip including a first resilient arm designed to slide over the user's belt with a lower end extending below the user's belt and an inwardly projecting tab on the lower end of the resilient arm configured to engage the user's belt to prevent the locking belt clip from lifting off the user's belt;

a locking knife clip configured to be detachably mounted to the sheath for securing the knife in the sheath, the locking knife clip including a second resilient arm designed to extend above a top end of the sheath, the second resilient arm including an inwardly projecting tab configured to engage the knife while the knife is in the sheath to prevent the knife from being removed from the sheath without first disengaging the locking knife clip;

a fastener configured to:

detachably secure the locking belt clip when the locking belt clip is attached to the sheath;

detachably secure the locking knife clip when the locking knife clip is attached to the sheath;

detachably secure the locking belt clip and locking knife clip when both are attached to the sheath.

2. The sheath assembly of claim 1, wherein the sheath includes a lip configured to engage a lower end of the locking knife clip when the locking knife clip is attached to the sheath.

3. The sheath assembly of claim 1, wherein the second resilient arm includes a least one wing projecting above the sheath and configured to be engaged by the user's finger to disengage the locking knife clip to allow removal of the knife from the sheath.

4. The sheath assembly of claim 2, wherein the second resilient arm includes a pair of wings projecting above the sheath.

5. The sheath assembly of claim 1, wherein the fastener comprises a threaded fastener.

6. The sheath assembly of claim 1, further comprising a retention strap including a ring configured to engage the locking belt clip and a securing strap with mating fasteners on opposite ends thereof for extending around the knife handle.

7. The sheath assembly of claim 1, wherein the retention strap includes a connecting strap configured to be interwoven with a MOLLE vest.

8. A sheath assembly with modular locking attachments, the sheath assembly comprising a sheath configured to hold a knife;

a locking knife clip configured to be detachably mounted to the sheath for securing the knife in the sheath, the locking knife clip includes a resilient arm with an inwardly projecting tab configured to engage the knife while the knife is in the sheath to prevent the knife from being removed from the sheath without first disengaging the locking knife clip; and wherein the resilient arm includes a pair of wings that extend above a top end of the sheath, wherein the wings are disposed on opposing sides of the knife handle when the knife is inserted into the sheath and are and configured to be engaged by the user's finger to disengage the locking knife clip to allow removal of the knife from the sheath.

9. The sheath assembly of claim 7, wherein the sheath includes a lip configured to engage a lower end of the locking knife clip when the locking knife clip is attached to the sheath.

10. The sheath assembly of claim 8, further comprising a locking belt clip configured to be detachably mounted to the sheath for securing the sheath to a user's belt, the locking belt clip including a first resilient arm designed to slide over the user's belt with a lower end extending below the user's belt and an inwardly projecting tab on the lower end of the resilient arm configured to engage the user's belt to prevent the locking belt clip from lifting off the user's belt.

11. The sheath assembly of claim 9, wherein the locking knife clip and locking locking belt clip are configured to be removably attached to the sheath on opposites sides of the sheath.

12. The sheath assembly of claim 9, further comprising a fastener configured to detachably secure the locking knife clip and locking belt clip to the sheath.

13. The sheath assembly of claim 8, further comprising a retention strap including a ring configured to engage the locking belt clip and a securing strap with mating fasteners on opposite ends thereof for extending around the knife handle.

14. The sheath assembly of claim 12, wherein the retention strap includes a connecting strap configured to be interwoven with a MOLLE vest.

15. A sheath assembly with modular locking attachments, the sheath assembly comprising a sheath configured to hold a knife;

a locking belt clip configured to be detachably mounted to the sheath for securing the sheath to a user's belt, the locking belt clip including a resilient arm designed to slide over the user's belt with a lower end extending below the user's belt and an inwardly projecting tab on the lower end of the resilient arm configured to engage the user's belt to prevent the locking belt clip from lifting off the user's belt; and a retention strap including a ring configured to engage the locking belt clip and a securing strap with mating fasteners on opposite ends thereof for extending around the knife handle.

16. The sheath assembly of claim 14, wherein the retention strap includes a connecting strap configured to be interwoven with a MOLLE vest.

* * * * *